United States Patent
Luo et al.

(10) Patent No.: US 7,313,268 B2
(45) Date of Patent: Dec. 25, 2007

(54) METHOD FOR USING EFFECTIVE SPATIO-TEMPORAL IMAGE RECOMPOSITION TO IMPROVE SCENE CLASSIFICATION

(75) Inventors: Jiebo Luo, Pittsford, NY (US); Robert T. Gray, Rochester, NY (US); Matthew R. Boutell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 862 days.

(21) Appl. No.: 10/647,722

(22) Filed: Aug. 25, 2003

(65) Prior Publication Data

US 2004/0120572 A1 Jun. 24, 2004

Related U.S. Application Data

(60) Provisional application No. 60/422,666, filed on Oct. 31, 2002.

(51) Int. Cl.
*G06K 9/62* (2006.01)
(52) U.S. Cl. ........................... 382/159; 382/224
(58) Field of Classification Search ................ 382/159, 382/224, 276, 156, 254
See application file for complete search history.

(56) References Cited

U.S. PATENT DOCUMENTS

| | | | |
|---|---|---|---|
| 6,185,335 B1 * | 2/2001 | Karidi et al. ................ 382/224 |
| 6,360,008 B1 * | 3/2002 | Suzuki et al. ................ 382/167 |
| 6,421,463 B1 * | 7/2002 | Poggio et al. ............... 382/224 |
| 6,545,743 B1 * | 4/2003 | Luo et al. ....................... 355/18 |
| 6,650,766 B1 * | 11/2003 | Rogers et al. ............... 382/132 |
| 6,801,645 B1 * | 10/2004 | Collins et al. ............... 382/130 |
| 6,915,025 B2 * | 7/2005 | Wang et al. .................. 382/289 |
| 6,944,319 B1 * | 9/2005 | Huang et al. ................ 382/118 |
| 7,047,325 B2 * | 5/2006 | Kondo et al. .................. 710/16 |
| 7,113,636 B2 * | 9/2006 | Ii et al. ......................... 382/159 |
| 2004/0120572 A1 * | 6/2004 | Luo et al. ..................... 382/159 |
| 2005/0105806 A1 * | 5/2005 | Nagaoka et al. ............. 382/224 |
| 2006/0171595 A1 * | 8/2006 | Hasegawa et al. ........... 382/224 |

FOREIGN PATENT DOCUMENTS

| WO | WO 99 57622 A | 11/1999 |
| WO | WO 02 059828 A | 8/2002 |

OTHER PUBLICATIONS

"Content-based hierarchical classification of vacation images" by A. Vailaya, M. Figueiredo, A. Jain, and H.J. Zhang. *Proceedings of IEEE International Conference on Multimedia Computing and Systems*, 1999.

(Continued)

Primary Examiner—Gregory M Desire
(74) Attorney, Agent, or Firm—Robert L. Walker

(57) ABSTRACT

A method for improving scene classification of a digital image comprising the steps of: (a) providing an image; (b) systematically recomposing the image to generate an expanded set of images; and (c) using a classifier and the expanded set of images to determine a scene classification for the image, whereby the expanded set of images provides at least one of an improved classifier and an improved classification result.

16 Claims, 8 Drawing Sheets

OTHER PUBLICATIONS

"Rotation invariant neural network-based face detection" by H. Rowley, S. Baluja, and T. Kanada. *Proceedings of IEEE Conference on Computer Vision and Pattern Recognition*, 1998.

*Pattern Classification* by R.O. Duda, P.E. Hart, and D.G. Stork, John Wiley & Sons, New York, 2001, pp. 475-476.

"The combining classifier: To train or not to train?" by R.P.W. Duin, *Proceedings of International Conference on Pattern Recognition*, 2002.

*Advances in Kernal Methods: Support Vector Learning* by B. Scholkopf, C. Burges, and A. Smola. MIT Press, Cambridge, MA, 1999, pp. 256-268.

"Content-based image orientation detection with support vector machines" by Y. Wang and H. Zhang. *Proceedings of IEEE Workshop on Content-Based Access of Image and Video Libraries*, 2001.

XP-002950555, Zhou X S et al: "Comparing Discriminating Transformations and SVM for Learning During Multimedia Retrieval", Automatic Digital Computation. London, Mar. 25-28, 1953, London, Her Majesty's Stationary Office, GB, pp. 137-146.

* cited by examiner

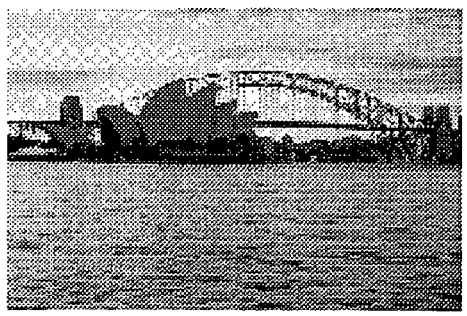
FIG. 6(a)
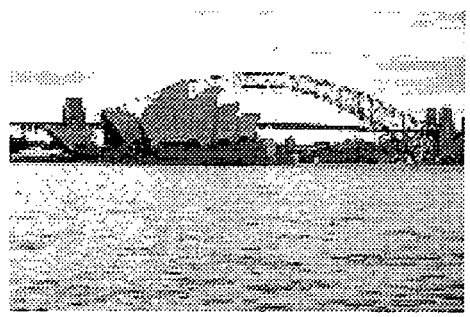
FIG. 6(b)
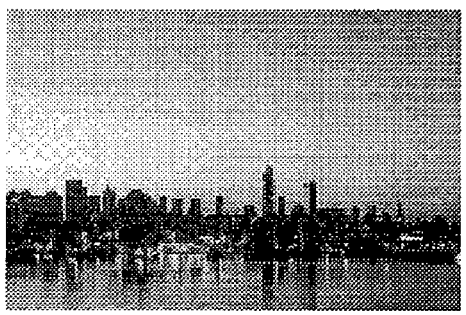
FIG. 6(c)
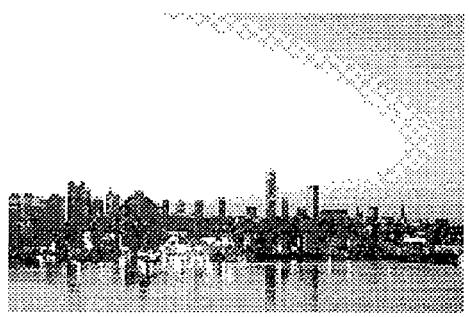
FIG. 6(d)
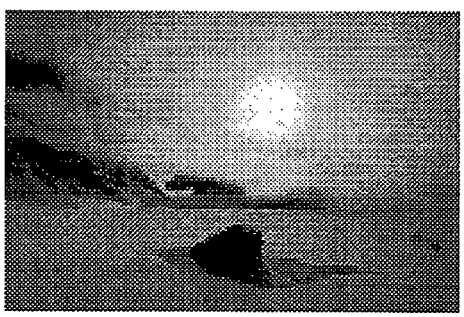
FIG. 6(e)
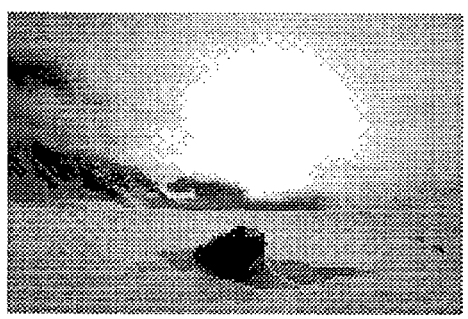
FIG. 6(f)
|   | ORIG | T10 | T20 | B10 | B20 | L10 | L20 | R10 | R20 |
|---|------|-----|-----|-----|-----|-----|-----|-----|-----|
| N | -.03 | -0.2 | -0.4 | -0.3 | -0.5 | -0.2 | -0.1 | -0.1 | -0.2 |
| S | 0.8 | 0.5 | 0.2 | 0.8 | 0.9 | 0.6 | 0.4 | 0.8 | 1.1 |
| E | -0.4 | -0.1 | 0.3 | -0.3 | -0.7 | -0.3 | -0.6 | -0.3 | -0.2 |
| W | -1.4 | -1.3 | -1.1 | -0.9 | -0.6 | -1.3 | -1.2 | -0.6 | -0.7 |
|   | S | S | E | S | S | S | S | S | S |
(VOTES: 8S, 1E → S)
FIG. 7

METHOD FOR USING EFFECTIVE SPATIO-TEMPORAL IMAGE RECOMPOSITION TO IMPROVE SCENE CLASSIFICATION

This application claims benefit of application Ser. No. 60/422,666 filed Oct. 31, 2002.

FIELD OF THE INVENTION

The invention relates generally to the field of digital image processing and, more particular to a method for using multiple recomposed versions of the input digital image to improve scene classification.

BACKGROUND OF THE INVENTION

Automatically determining the semantic classification (e.g., sunset, picnic, beach) of an arbitrary image is a difficult problem. Much research has been done recently, and a variety of classifiers and feature sets have been proposed. The most common design for such systems has been to use low-level features (e.g., color, texture) and statistical pattern recognition techniques. Such systems are exemplar-based, relying on learning patterns from a training set (see A. Vailaya, M. Figueiredo, A. Jain, and H. J. Zhang, "Content-based hierarchical classification of vacation images", *Proceedings of IEEE International Conference on Multimedia Computing and Systems*, 1999). Such exemplar-based systems are in contrast to model-based systems, in which the characteristics of classes are specified directly using human knowledge, or hybrid systems, in which the model is learned.

Semantic scene classification can improve the performance of content-based image organization and retrieval (CBIR). Many current CBIR systems allow a user to specify an image and search for images similar to it, where similarity is often defined only by color or texture properties. This so-called "query by example" has often proven to be inadequate. Knowing the category of a scene a priori helps narrow the search space dramatically. For instance, knowing what constitutes a party scene allows us to consider only party scenes in our search to answer the query "Find pictures of Mary's birthday party". This way, the search time is reduced, the hit rate is higher, and the false alarm rate is expected to be lower.

Current scene classification systems enjoy limited success on unconstrained image sets. What are the reasons for this? The primary reason appears to be the incredible variety of images found within most semantic classes. Exemplar-based systems must account for such variation in their training sets. Even hundreds of exemplars do not necessarily capture all of the variability inherent in some classes. Take the class of sunset images as an example. Sunset images captured at various stages of the sunset can vary greatly in color, as the colors tend to become more brilliant as the sun approaches the horizon, and then fade as time progresses further. The composition can also vary, due in part to the camera's field of view: does it encompass the horizon or the sky only? Where is the sun relative to the horizon? Is the sun centered or offset to one side?

A second reason for limited success in exemplar-based classification is that images often contain excessive or distracting foreground regions, which cause the scene to look less prototypical and thus not match any of the training exemplars well. For example, FIG. 1 shows four scenes (a)-(d) with distracting foreground regions. This is especially true in consumer images, where the typical consumer pays less attention to composition and lighting than would a professional photographer. Therefore, consumer images contain greater variability, causing the high performance (on professionally-taken stock photo libraries) of many existing systems to decline when used in this domain.

Consequently, a need exists for a method that overcomes the above-described issues in image classification. These issues are addressed by introducing the concept of spatial image recomposition, designed to minimize the impact of undesirable composition (i.e., foreground objects), and of simulated or effective temporal image recomposition, designed to minimize the effects of color changes occurring over time.

This approach is supported by past success in other domains. In face recognition and detection, researchers used perturbed versions of faces in training (e.g., see H. Rowley, S. Baluja, and T. Kanade, "Rotation invariant neural network-based face detection", *Proceedings of IEEE Conference on Computer Vision and Pattern Recognition*, 1998) in order to handle geometric variation. This is related to resampling or bootstrapping. In addition, bagging (bootstrap aggression) uses multiple versions of a training set to train a different component classifier and the final classification decision is based on the vote of each component classifier (see R. O. Duda, P. E. Hart, and D. G. Stork, *Pattern Classification*. John Wiley & Sons, New York, 2001, pp. 475-476).

SUMMARY OF THE INVENTION

The present invention is directed to overcoming one or more of the problems set forth above. Briefly summarized, according to one aspect of the present invention, the invention resides in a method for improving image classification of a digital image comprising the steps of: (a) providing an image; (b) systematically recomposing the image to generate an expanded set of images; and (c) using a classifier and the expanded set of images to determine an image classification for the image, whereby the expanded set of images provides at least one of an improved classifier and an improved classification result.

The present invention provides a method for either (or both) systematically generating recomposed versions of an exemplar image to generate an expanded set of training exemplars to derive a robust classifier, or systematically generating recomposed versions of a testing input digital image to generate an expanded set of testing images with the same salient characteristics to derive a robust image classification result. This has the advantage of increasing the diversity of training exemplars, allowing better match of an image with exemplars, and providing a method of obtaining more robust image classification.

BRIEF DESCRIPTION OF THE DRAWINGS

FIGS. 6(a)-6(f) show examples of how sunsets and false positives are processed when temporal recompositions are used, where the original (left images) and illuminant-shift (+6 buttons) images (right images) are shown. Note that the bottom image is one of the purposefully confusing images: A winter scene with the sun low in the horizon, but not setting.

FIG. 7 shows a table resolving independent recomposition decisions using voting where, e.g., "T10" means 10% cropped from the image top, and so on.

DETAILED DESCRIPTION OF THE INVENTION

The present invention will be described as implemented in a programmed digital computer. It will be understood that a person of ordinary skill in the art of digital image processing and software programming will be able to program a computer to practice the invention from the description given below. The present invention may be embodied in a computer program product having a computer readable storage medium such as a magnetic or optical storage medium bearing machine readable computer code. Alternatively, it will be understood that the present invention may be implemented in hardware or firmware.

A large obstacle to high performance in semantic scene classification is the immense variety, both in terms of color and composition, of images in each class. Obtaining enough training data for an exemplar-based system can be a daunting task, especially when the classes contain many variations. Manually collecting large numbers of high-quality, prototypical images is time-consuming, even with the help of themed stock photo libraries. Therefore, it is critical to make efficient use of all available training data.

Figure 1A:
FIGS. 1(a)-1(d) show four examples of sunset images with distracting foreground regions.
Figure 1B:
Figure 1C:
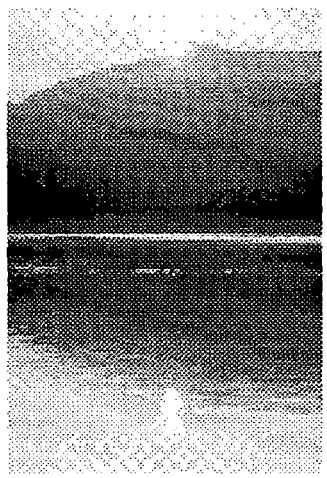
Figure 1D:
Figure 2A:
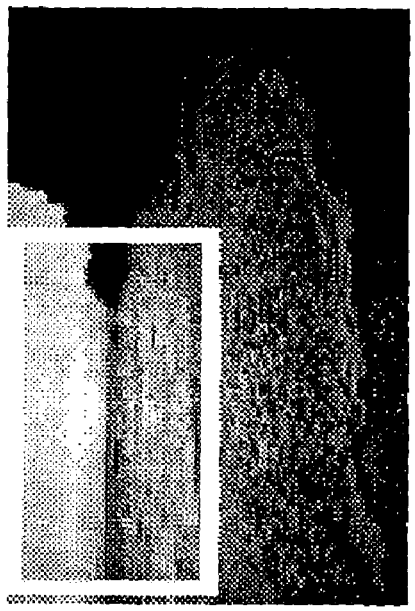
FIGS. 2(a)-2(d) show a series of images exemplifying how an arbitrary image (a) is transformed into one (d) that better matches a prototypical exemplar.
Figure 2B:
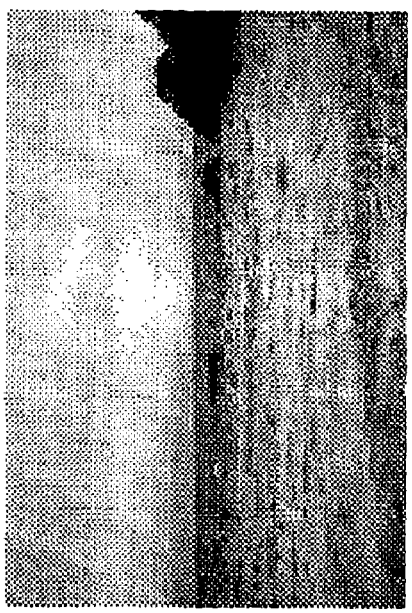
Figure 2C:
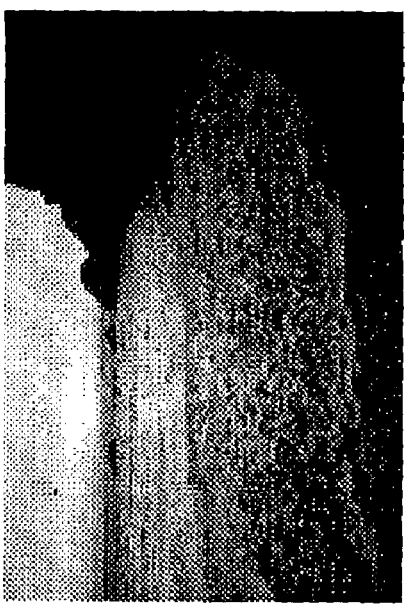
Figure 2D:
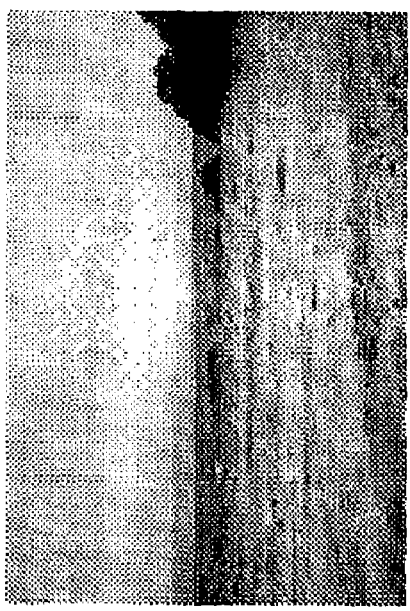

Furthermore, the best match of a testing image with the set of training exemplars occurs when the image matches an exemplar of its class, both in its color and its composition. However, the test image may contain variations not present in the training set. The degree of match is affected by the photographer's choice of what to capture in the image (affecting its composition) and when to capture the image (potentially affecting its color due to changes in the scene illuminant over time). If it were possible to "relive" the scene, one could attempt to obtain an image with more prototypical color and composition for the class. For instance, referring to FIGS. 2(a)-2(d), an original scene (FIG. 2(a)) contains a salient sub-region (FIG. 2(b)) which is cropped and re-sized (FIG. 2(c)). Finally, in FIG. 2(d), an illuminant shift is applied, simulating a sunset occurring later in time. How can one "relive" the scene? In other words, how can one transform an arbitrary image into one that will match a prototypical exemplar better?

According to the invention, a concept called effective spatial and temporal recomposition is used to address the above issues. Image recomposition is generally defined as a process that systematically creates altered versions of the same image, including spatial composition and color composition. The different types and uses of spatial recomposition (mirroring and cropping images) and effective (simulated) temporal recomposition (shifting the color of images) are presented in Table 1 and will be elaborated in more detail below. They are categorized as recomposition in training, testing, and both. Some type-use combinations need visual inspection to ensure such recompositions do not destroy the integrity of the training examples (e.g., aggressive crop may result in the loss of the main subject of the picture).

TABLE 1

Types and Uses of Image Recomposition

| Type | Use |
| --- | --- |
| Mirror | Training |
| Conservative crop | Training, testing |
| Aggressive crop | Training (need inspection), testing |
| Color shift | Training (need inspection), testing |

Recomposition in Training

Figure 3A:
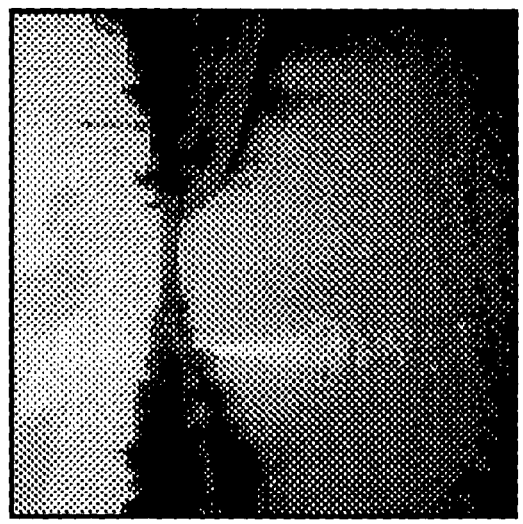
FIGS. 3(a)-3(c) show an example of spatial recompositions, where original image (b) can be transformed by a horizontal mirroring (a) or a crop (20% from bottom as shown on (c)).
Figure 3B:
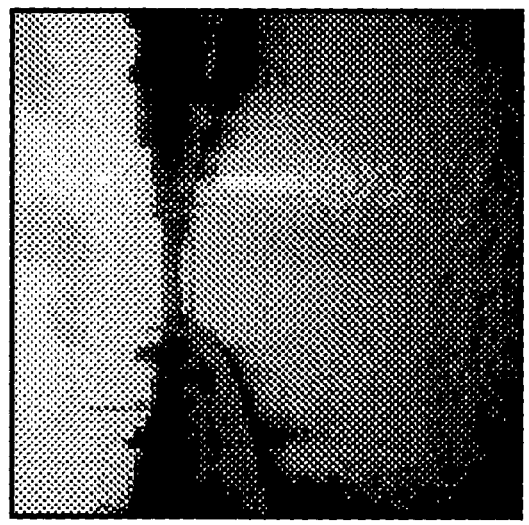
Figure 3C:
Figure 4A:
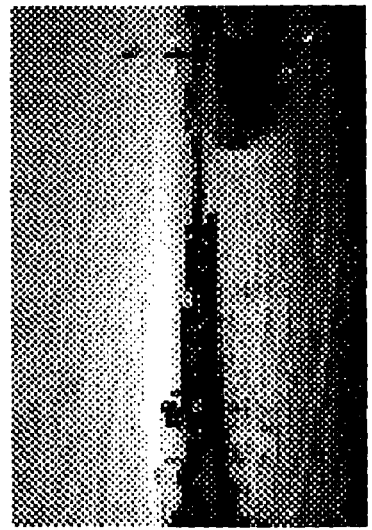
FIGS. 4(a)-4(f) show an example of temporal recomposition comprising a series of illuminant shifts.
Figure 4B:
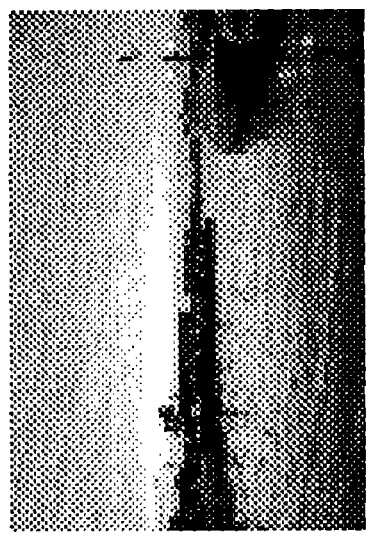
Figure 4C:
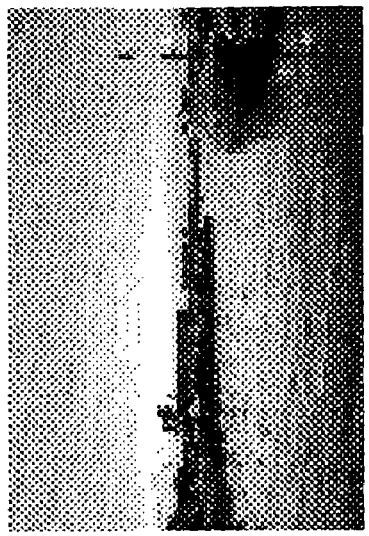
Figure 4D:
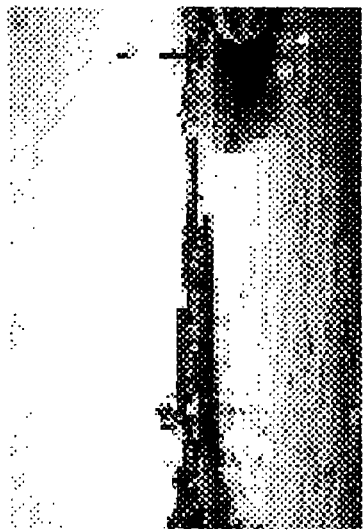
Figure 4E:
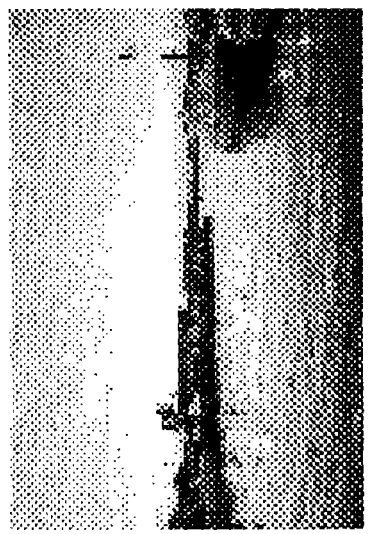
Figure 4F:
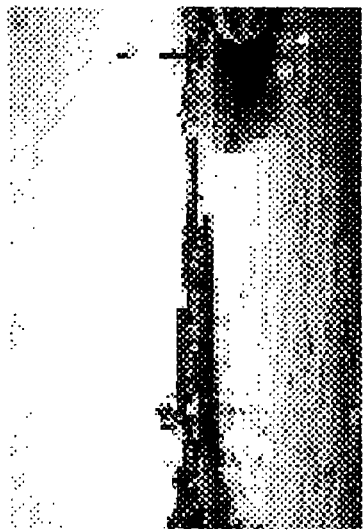

Using recomposition on a limited-size set of training data can yield a much richer, more diverse set of exemplars. The goal is to obtain these exemplars without having to inspect each image visually. One technique is to reflect each image about the vertical axis, thereby doubling the number of exemplars. For instance, as shown in FIGS. 3(a)-3(c), the original image (3(b)) is transformed by a horizontal mirroring (3(a)) or a crop (20% from the bottom as shown in 3(c)). Clearly, the classification of the new image is unchanged; that is, while reflecting a sunset image with the sun on the left side of the image moves the sun to the right side, the image remains a valid sunset image.

Another technique is to crop the edges of an image. The assumption is that the salient portion of an image is in the center and imperfect composition is caused by distractions in the periphery. Cropping from each side of the image in turn produces four new images of the same classification. Of course, one does not want to lose a salient part of the image (such as the sun or the horizon line in a sunset), but for a conservative crop of a small amount, e.g., 10%, the semantic classification of a scene is highly unlikely to change, although the classification by an algorithm may change.

Recomposition in Testing while recomposing the training set yields more exemplars, recomposing a test image and classifying each new, recomposed image yields multiple classifications of the original image. In terms of spatial recomposition, the edges of the image can be cropped in an attempt to match better the features of a test image against the exemplars. It may be necessary to crop more aggressively (as in FIG. 2) to obtain such a match. However, if the classifier has been trained using mirrored images, there is no need to mirror the test image due to symmetry already built into the classifier. For example, when using a 1-NN classifier, the feature vector, T, of a testing image will lie a certain distance from the nearest exemplar vector E. Call the vectors of the reflected images of E and T, E' and T', respectively. Due to symmetry in the features, $d(E,T)=d(E', T')$, making T' redundant.

Some classes of images contain a large variation in their global color distribution, and shifting the overall color of the test image appropriately can yield a better match with a training exemplar. Using the class of sunset images as an example, an early and a late sunset may have the same spatial distribution of color (bright sky over dark foreground), but the overall appearance of the early sunset is much cooler, due to a color change in the scene illuminant. By artificially changing the color along the illuminant (=red-blue) axis towards the warmer side, we can simulate the appearance of capturing the image later in time; we dub this illuminant shift an effective temporal recomposition. For example, as shown in FIGS. 4(a)-4(f), a temporal recomposition comprises a series of illuminant shifts in 3-button increments, starting from −6 buttons (FIG. 4(a)) and ending at +9 buttons (FIG. (f)), where a button equals 0.4 of a photographic stop. Likewise, variation within the amount of illuminant in the scene can be handled using changes along the luminance axis. Color shift along other axes may be applicable in other problem domains.

Whether using spatial or temporal recomposition, the classifier may or may not label a new, recomposed image with the same class as the original image. How does one adjudicate when the classifications of the recomposed images differ? Duin (see R. P. W. Duin, "The combining classifier: To train or not to train?", *Proceedings of International Conference on Pattern Recognition,* 2002) discussed two types of combiners, fixed and trained. Fixed combining rules include voting schemes and using the sum or average of the scores. A trained combiner is a second classifier for mapping the scores to a single score. Two considerations affect the choice of which to use: the availability of training data and the degree to which the base classifiers have been trained. Duin suggests that undertrained classifiers can benefit from a trained combiner, while those that are overtrained (e.g., support vector machines (SVMs)) cannot. In the present study, this was found to be the case (e.g., a second-stage SVM did not help).

In a two-class problem, one interesting fixed combiner of r recompositions is to use the m-th order statistic, e.g., the maximum (m=1), the second largest (m=2), or the median (m=r/2). Varying the parameter m moves the classifier's position on the operating curve. Small m classifies images positively in an aggressive manner, giving greater recall at the expense of more false positives. The choice of m will clearly depend on the application.

The scores can also be combined in such a way as to find the most consistent image classification. For instance, a voting scheme can be used for combination. This is desirable: classification based on a number of slightly varied recomposed images with the same salient scene content should be more robust than classification based on the original image alone. If the single classification based on the original image is incorrect due to some statistical anomaly (e.g. foreground distractions or poor spatial registration with the set of exemplars), yet many of the recomposed images are classified correctly, a majority rule will correct the anomaly.

Recomposition in Both Training and Testing

For some applications, recomposition may be used on both the training and testing data. Since each serves a different purpose, they may be combined readily. One may question the need for using both types of recompositions; namely, if one had a sufficiently rich set of training exemplars, why would recomposing the test image be necessary? The need to use recomposition in both training and testing is practical. There is no guarantee that the training data is diverse enough to begin with, or that recomposition in training exemplars has exhaustively created all possible variations and completely fills the image space.

A related question is the choice between recomposing training images and obtaining additional unique exemplars. Aside from the argument presented earlier about the lack of good training data, and the time necessary to gather it, there is also the question of the quality of the data available. Recomposing a small set of prototypical exemplars is likely to be more desirable than using more but lesser quality exemplars.

In addition, use of recomposition in testing on top of recomposition in training is certainly a way to boost recall if so desired, though potentially at the expense of a higher false alarm rate.

A last question is whether a more aggressive approach may be used in recomposing the training data so as to minimize the need to recompose the test data. Because aggressive recomposition can cause images to lose their salient content, one must ensure that the integrity of the expanded training set is not compressed; the discussion now turns to a technique for doing exactly this.

Semi-supervised Recomposition in Training

Our goal in using conservative recompositions on the training set is to make the process completely unsupervised. However, if yet more training data is desired and aggressive recompositions, such as larger amounts of cropping or significant color shifts, are used, a training methodology is needed so that one does not need to go to the other extreme, that of inspecting every recomposed image.

Admittedly, because some aggressive recompositions can remove some scene content characteristic to the class of an image, a more rigorous approach to adding these images to the training data would be to visually inspect each of the recomposed training images. Doing so can be tedious and laborious. Only inspecting a subset of the recomposed images needing attention would be more efficient. In order to screen the recomposed images, one can train a classifier using the original training images and then classify the recomposed versions of the training images using this classifier. Only those recomposed images that fail (or pass with low confidence) the classifier need to be evaluated visually to determine if the recomposition has caused the image to lose salient scene content. Such recomposed images are then eliminated while the remaining recomposed images are added to the expanded training set to improve its richness. This is a preferred tradeoff between generating fewer recomposed images in an unsupervised manner and generating many recomposed images in a completely supervised fashion.

Next, three preferred embodiments of the present invention are described for sunset detection, outdoor scene classification, and automatic image orientation detection, respectively.

Sunset Detection

In the aforementioned hierarchical image classification scheme described by Vailaya et al., sunsets were easily separated from mountain/forest scenes. Color was found to be more salient for the problem than other features, such as edge direction alone, confirming an intuition that sunsets are recognizable by their brilliant, warm colors. Furthermore, spatial information should be incorporated to distinguish sunsets from other scenes containing warm colors, such as those of desert rock formations. Therefore, spatial color moments may be used, dividing the image into 49 regions using a 7×7 grid and computing the mean and variance of each band of a Luv-transformed image. This yields 49×2× 3=294 features.

A Support Vector Machine (SVM) is preferably used as the classifier because SVMs have been shown to give higher performance than other classifiers such as Learning Vector Quantizers (LVQ) on similar problems (See, for example, B. Scholkopf, C. Burges, and A. Smola, *Advances in Kernel Methods: Support Vector Learning,* MIT Press, Cambridge, Mass., 1999, pp. 263-266, and Y. Wang and H. Zhang, "Content-based image orientation detection with support vector machines," *Proceedings of IEEE Workshop on Content-Based Access of Image and Video Libraries,* 2001). In particular, a Gaussian kernel was used, creating an RBF-style classifier (RBF=Radial Basis Function, see Wang and Zhang). SVMs are designed for two-class problems, and output a real number for each testing image. The sign is the classification and the magnitude can be used as a loose measure of the confidence.

Using recomposition in the training set increased performance significantly, presumably because the set was much richer. This overcomes some of the effects of having a limited training set. Using recompositions in the testing set increased both the number of hits and the number of false positives. Finally, using recompositions in both training and testing gave the best results overall. Note that these results correspond to optimal operating points on different curves.

Using spatial recomposition on the testing images met the goal of correctly classifying sunset images with large distracting foreground regions: for example, the images presented in FIG. 1 were all classified incorrectly by the baseline system, but correctly when recomposition was used (gained by recomposition). The image (b) on the upper right is a good example of how recomposition by cropping can help. Cropping the large, dark, water region in the foreground from the image increases the SVM score substantially. The other images fared similarly: for example, cropping the bottom 20% from the bottom left image (a) eliminates the confusing reflection in the water.

Figure 5B:
FIGS. 5(a) and 5(b) show typical examples of false positives induced by using spatial recomposition.
Figure 5A:

However, the number of false positive images also increased, partially offsetting the gain in recall. Typical false positives induced by recomposition are shown in FIGS. 5a and 5b. Each of these images contains patterns not typical of sunsets (e.g., the multiple bright regions in the night image, or the sky in the desert image), which when cropped out, make the image appear to be much more sunset-like.

Some sunset images have prototypical composition, but weak colors, corresponding to early or late sunsets. Shifting the scene illuminant "warms up" these images, causing them to be classified correctly, but also introduces many false positives, both of which are shown in FIG. 6.

Outdoor Scene Classification

The above system is extended to distinguish between six types of outdoor scenes: beach, sunset, fall foliage, field, mountain, and urban (defined in Table 2). The images used for training and testing included professional and consumer images. The same features and classifier are used as for the sunset detector, although the SVM classifier was extended to multiple classes by using a one-vs.-all approach (see B. Scholkopf, C. Burges, and A. Smola. *Advances in Kernel Methods: Sunport Vector Learning.* MIT Press, Cambridge, Mass., 1999, pp 256-258). Spatial recomposition was especially effective when used in training, since the training set was still limited. Recomposition was not used on the testing set.

TABLE 2

Definitions of six outdoor scene classes

| Class | Definition |
| --- | --- |
| Beach | At least 5% each of water, sand, and sky |
| Sunset | Illuminant source in front of camera |
| Fall foliage | Detectable color in turned leaves on tree |
| Field | No aerial view, not cluttered with trees ("open") |

TABLE 2-continued

Definitions of six outdoor scene classes

| Class | Definition |
| --- | --- |
| Mountain | Open, whole mountains, mid-range view, Less than 90% snow or fog-covered |
| Urban | At least one building, no extreme perspectives |

Image Orientation Detection

The goal of automatic image orientation detection (see Y. Wang and H. Zhang, "Content-based image orientation detection with support vector machines", *Proceedings of IEEE Workshop on Content-Based Access of image and Video Libraries,* 2001) is to classify an arbitrary image into one of four compass directions (N, S, E, W), depending on which direction the top of the image is facing. Doing so based on image content alone is a difficult problem. For the preferred embodiment, a baseline system uses spatial color moments and a one-vs.-all SVM classifier, which is similar and achieves similar results to that in Wang et al.

Recomposition in testing can be expected to improve classification in this domain as well, but the rationale for using it is much different: cropping the edges of an image should not affect the perceived orientation of the image. Therefore, the combined classification based on a number of slightly different images should be more robust than that of a single image. Experimenting with both fixed (voting) and trained combiners, the performance of each was found to be comparable; voting was chosen for its simplicity.

In this application, an image is classified with four scores, each coming from a SVM tuned to recognize images of a given orientation. The one-vs.-all classifier classifies the image with the orientation corresponding to the SVM that yields the maximum score. This process is repeated nine times, once for each cropped version of the image. The process finally votes among the nine classifications, using the scores to break ties (although a tie means no single orientation dominated and that the image is a good candidate for rejection, i.e., no apparent orientation). An example of the voting scheme is given in FIG. 7.

Figure 8C:
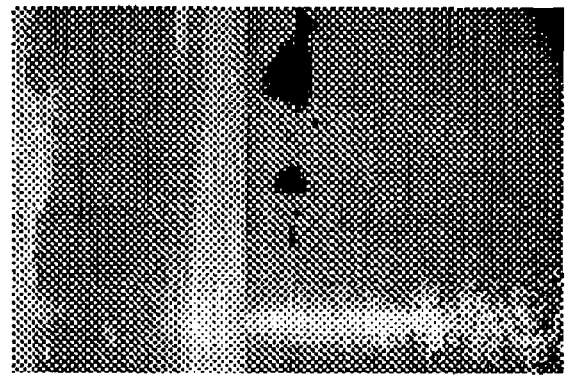
FIGS. 8(a)-8(c) show examples of sample testing images that gained by using recomposition according to the invention.
Figure 8B:
Figure 8A:
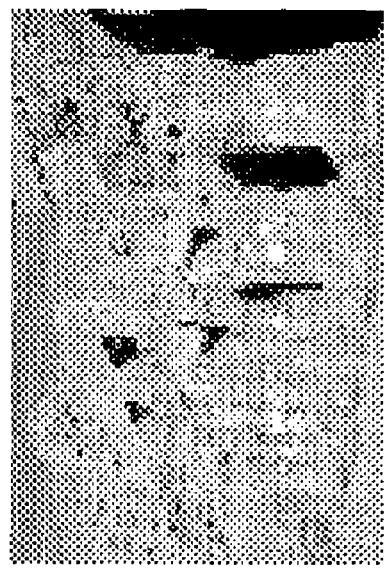

Sample images that were gained by using the recomposition scheme are shown in FIG. 8. In each of these cases, some region on the border of the image is distracting. The dark shadows (FIG. 8(c)), the dark trees (FIG. 8(b)), and the reflection of the sun (FIG. 8(c)) all confused the classifier; bright or dark regions appear at the side of an image, not at the top or bottom.

Image recomposition is similar in spirit to bootstrapping or bagging methods, with a major distinction being that only a single classifier is trained and used in classification. The key to successful application of this scheme to an image classification problem is that such image recomposition would only affect the distractive components in the image in such a way that they can be discounted in the final classification and the salient content is invariant to such perturbation to the image. Thus, this is a general approach to boosting classification performance as long as appropriate ways of recomposition are selected according to the domain of problem and the features/classifier used.

The following guidelines are offered to help decide how to use image recomposition in image classification. First, if the training set is sparse, using conservative spatial recompositions can help greatly. More aggressive recomposition, both spatial and temporal, should be done in a semi-supervised manner. In a two-class problem, recomposing the test image can cause a better match with an exemplar of the same class, giving an operating curve parameter that can be used to customize the performance to the application. In a multi-class problem, voting among the classifications of recomposed images is more robust. Clearly, in the ideal case where classes are well separated in training data and testing images match the exemplars well, recomposition is not expected to help much.

Figure 9:
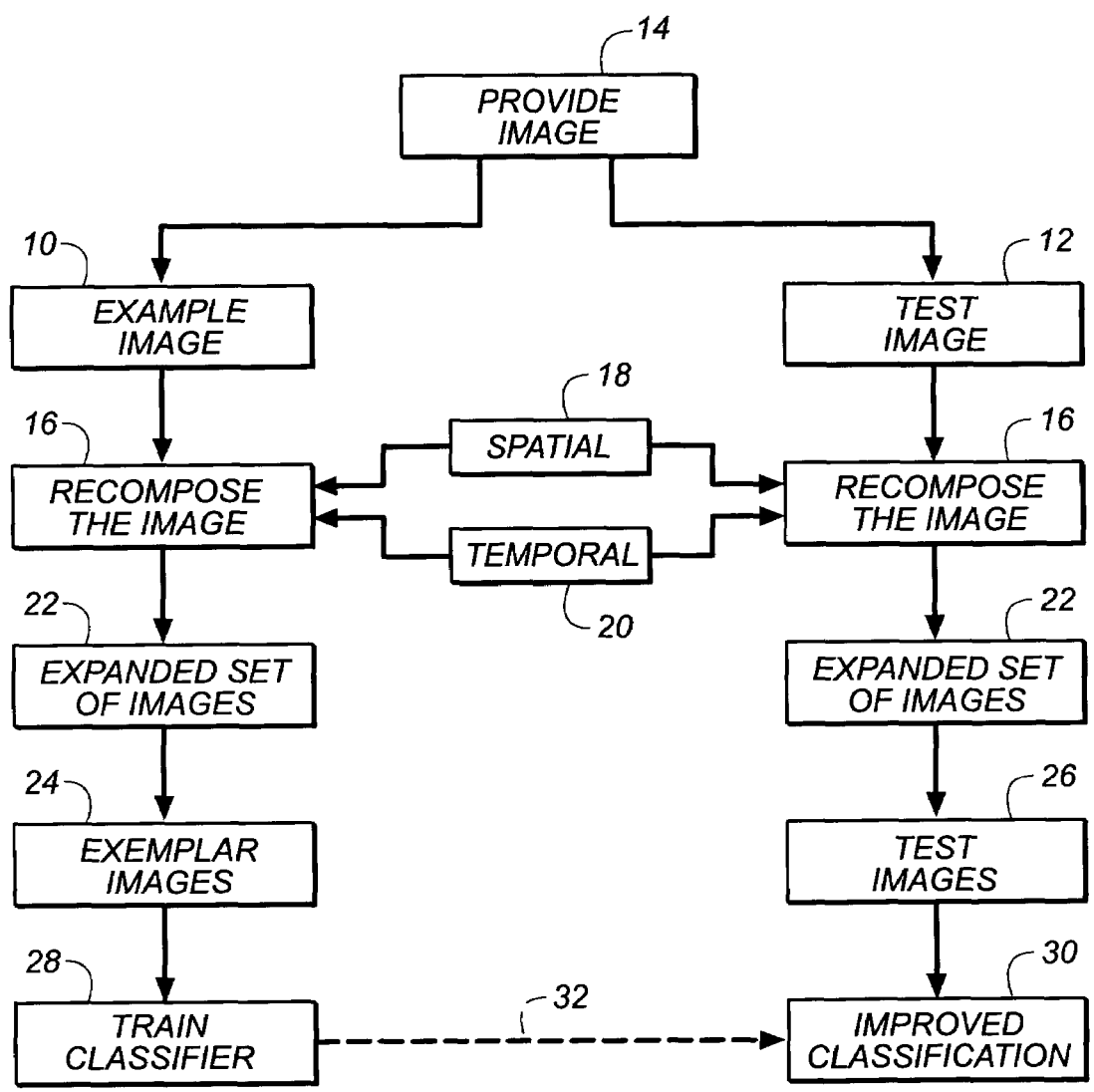
FIG. 9 is a diagram illustrating elements of a method for practicing the present invention.

FIG. 9 shows a diagram of the method for improving the scene classification of a digital image according to the invention. Initially either an input exemplar image 10 or an input test image 12 is provided in an input stage 14 and then applied to a recomposition stage 16, where the input image is systematically recomposed according to either a spatial recomposition algorithm 18 or a temporal recomposition algorithm 20 (or both), as described heretofore in the detailed description of the invention. The result of the recomposition is an expanded set of images 22, which depending on the type of input image (exemplar or test image) will be an expanded set of exemplar images 24 or an expanded set of test images 26 (or both). If the expanded set of images are exemplar images, they are used to train the classifier in a training stage 28, thereby providing an improved classifier according to the invention. If the expanded set of images are test images, they are used in a classifier stage 30, thereby providing an improved image classification result according to the invention. As indicated by the broken line 32 connecting the training stage 28 and the classification stage 30, the improved classifier resulting from the expanded set of exemplar images 24 may be used together with the expanded set of test images 26 to provide an overall improved classification result. However, it is also possible to apply the recomposition stage 16 in only one of the two paths shown in FIG. 10 (i.e., either in training an improved classifier or in providing an improved image classification result, but not both).

The subject matter of the present invention relates to digital image understanding technology, which is understood to mean technology that digitally process a digital image to recognize and thereby assign useful meaning to human understandable objects, attributes or conditions and then to utilize the results obtained in the further processing of the digital image.

Scene classification can also find application in image enhancement. Rather than applying generic color balancing and exposure adjustment to all scenes, the adjustment could be customized to the scene, e.g., retaining or boosting brilliant colors in sunset images while removing warm-colored cast from tungsten-illuminated indoor images.

The recomposition technique described by the present invention is not limited to photographic images. For example, spatial recomposition can also be applied to medical images for medical image classification (although color recomposition does not apply).

The invention has been described in detail with particular reference to certain preferred embodiments thereof, but it will be understood that variations and modifications can be effected within the spirit and scope of the invention.

PARTS LIST 10 input exemplar image
12 input test image
14 input stage

-continued

PARTS LIST 16 recomposition stage
18 spatial recomposition algorithm
20 temporal recomposition algorithm
22 expanded set of images
24 expanded set of exemplar images
26 expanded set of test images
28 training stage
30 classification stage
32 broken line

What is claimed is:

1. A method for improving image classification of a digital image comprising the steps of:
   (a) providing an image;
   (b) systematically recomposing the image to generate an expanded set of images; and
   (c) using a classifier and the expanded set of images to determine an image classification for the image, whereby the expanded set of images provides at least one of an improved classifier and an improved classification result,
   wherein the expanded set of images are used to train the classifier in step (c), thereby providing an improved classifier.

2. The method as claimed in claim 1 wherein the image provided in step (a) is an exemplar image and in step (b) the exemplar image is systematically recomposed to generate an expanded set of exemplar images.

3. The method as claimed in claim 2 wherein the image provided in step (a) further includes a test image and in step (b) the test image is systematically recomposed to generate an expanded set of test images.

4. The method as claimed in claim 3 wherein the expanded set of test images are processed with the improved classifier in step (c), thereby providing an improved image classification result from the improved classifier.

5. The method as claimed in claim 1 wherein step (b) comprises spatially recomposing the image to generate an expanded set of spatially recomposed images.

6. The method as claimed in claim 5 wherein spatially recomposing the image in step (b) comprises horizontally mirroring the image, thereby doubling the number of images in the expanded set of images.

7. The method as claimed in claim 5 wherein spatially recomposing the image in step (b) comprises systematically cropping the edges of the image from one or more sides of the image, thereby increasing the number of images in the expanded set of images.

8. The method as claimed in claim 5 wherein step (b) further comprises temporally recomposing one or more of the spatially recomposed images to generate an expanded set of images, whereby the images in the expanded set simulate the appearance of capturing an image earlier or later in time.

9. The method as claimed in claim 8 wherein temporally recomposing the images in step (b) comprises systematically shifting the color distribution of the images, thereby increasing the number of images in the expanded set of images.

10. The method as claimed in claim 8 wherein temporally recomposing the images in step (b) comprises systematically shifting the illuminant quality of the images, thereby increasing the number of images in the expanded set of images.

11. The method as claimed in claim 1 wherein step (b) comprises temporally recomposing the image to generate an expanded set of temporally recomposed images, whereby the images in the expanded set simulate the appearance of capturing an image earlier or later in time.

12. The method as claimed in claim 11 wherein temporally recomposing the image in step (b) comprises systematically shifting the color distribution of the image, thereby increasing the number of images in the expanded set of images.

13. The method as claimed in claim 11 wherein temporally recomposing the image in step (b) comprises systematically shifting the illuminant quality of the image, thereby increasing the number of images in the expanded set of images.

14. The method as claimed in claim 1 wherein the image classification is a scene classification and wherein the classifier and the expanded set of images are used in step (c) to determine a scene classification.

15. The method as claimed in claim 14 wherein either color balance or exposure adjustment is customized for the image based upon the scene classification.

16. The method as claimed in claim 1 wherein the image is a medical image, and wherein the step of systematically recomposing the image in step (b) is a spatial recomposition applied to the medical image and the classifier and the expanded set of images are used in step (c) to determine a medical image classification for the medical image.

* * * * *